United States Patent
Bhogal et al.

(10) Patent No.: US 8,776,012 B2
(45) Date of Patent: Jul. 8, 2014

(54) AUTOMATIC SCHEDULING OF REVIEW MEETINGS

(75) Inventors: Kulvir S. Bhogal, Fort Worth, TX (US); Lisa Seacat DeLuca, San Francisco, CA (US); Robert R. Peterson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 77 days.

(21) Appl. No.: 13/280,379

(22) Filed: Oct. 25, 2011

(65) Prior Publication Data

US 2013/0104098 A1  Apr. 25, 2013

(51) Int. Cl.
- G06F 9/44 (2006.01)
- G06Q 10/00 (2012.01)
- G06F 3/00 (2006.01)

(52) U.S. Cl.
USPC ........... 717/106; 717/101; 717/102; 717/103; 717/104; 717/105; 705/7.12; 715/810; 707/800

(58) Field of Classification Search
None
See application file for complete search history.

(56) References Cited

U.S. PATENT DOCUMENTS

| | | | | |
|---|---|---|---|---|
| 7,240,340 B2* | 7/2007 | Vaidyanathan et al. | | 717/143 |
| 7,937,281 B2* | 5/2011 | Miller et al. | | 705/7.12 |
| 8,019,631 B2* | 9/2011 | Bredin et al. | | 705/7.11 |
| 8,122,060 B2* | 2/2012 | Volkmer | | 707/802 |
| 8,132,153 B2* | 3/2012 | Subramanyam | | 717/121 |
| 8,185,428 B1* | 5/2012 | Campo et al. | | 705/7.25 |
| 2003/0084425 A1* | 5/2003 | Glaser | | 717/110 |
| 2003/0217073 A1* | 11/2003 | Walther et al. | | 707/104.1 |
| 2004/0189713 A1* | 9/2004 | Thames et al. | | 345/810 |
| 2007/0021996 A1* | 1/2007 | Barnard et al. | | 705/8 |
| 2007/0027934 A1* | 2/2007 | Roehrle et al. | | 707/203 |
| 2008/0177611 A1* | 7/2008 | Sommers et al. | | 705/8 |
| 2008/0263505 A1* | 10/2008 | StClair et al. | | 717/101 |
| 2010/0021469 A1* | 1/2010 | Cuttitta et al. | | 424/139.1 |
| 2010/0058291 A1* | 3/2010 | Hahn et al. | | 717/113 |
| 2010/0077375 A1* | 3/2010 | Millmore | | 717/101 |
| 2010/0241469 A1* | 9/2010 | Weigert | | 705/7 |
| 2011/0010214 A1* | 1/2011 | Carruth | | 705/8 |

* cited by examiner

Primary Examiner — Don Wong
Assistant Examiner — Mohammad Kabir
(74) Attorney, Agent, or Firm — Nicholas L. Cadmus; Arthur Samodovitz

(57) ABSTRACT

A tool for scheduling a project review meeting based on monitoring of one or more documents required for the project review meeting. The documents/files are identified along with criteria that the documents must meet prior to scheduling the review meeting. The criteria can be default criteria or specifically defined and entered by a user. The tool monitors the documents and in response to finding that the criteria has been met, determines meeting participants, generally collaborators working on the documents, determines the meeting participants' individual schedules, and determines a meeting time based on the meeting participants' individual schedules.

16 Claims, 4 Drawing Sheets

AUTOMATIC SCHEDULING OF REVIEW MEETINGS

FIELD OF THE INVENTION

The present invention relates generally to project management and more particularly to scheduling reviews of the project development.

BACKGROUND OF THE INVENTION

Collaborative development involves a work process, and often a collection of software applications, that facilitates various organizations and individuals to work together on the development of a product. Numerous digitally stored documents or files are often created in the course of developing the product, and the product itself may comprise multiple parts, such as illustrations, program/source code, spreadsheets, text documents, etc. For example, a development team collaboratively writing program code for a software application may create multiple source code files for compiling the software application, which may in turn be combined with other software applications to produce a final software product.

At various points in the development process, it is advantageous to bring together certain collaborators (individuals working on various tasks of the project) to review one or more of these parts. Such project review meetings help to ensure that problems do not develop in the project, collaborators are synchronized with each other, and that the work product is done correctly.

Often, project review meetings are scheduled by a project leader making a best-guess as to a good time to review certain documents. It is known that a tool may monitor lines of code written and, at a given threshold, indicate that a review of the code written should take place. For example, US Publication 2010/0077375 by Millmore teaches a monitor component comprising two indicators: a first indicator illustrating the number of lines of code that have been manually entered by a developer and a second component showing a measure of the total number of lines of computer program code that are part of the current project. The monitor component thus provides one or more indicators that show a developer when it is time to have their code reviewed (a developer may schedule a review if indicators show that a threshold of manually entered lines has been exceeded).

A known Rational™ Team Concert/Jazz tool maintains a list of developers of a software product, and the software functions which they are assigned to write.

SUMMARY

Aspects of an embodiment of the present invention disclose a method, computer system, and computer program product for scheduling a project review meeting for a project. The method comprises a computer determining whether one or more files (documents or source code) has progressed to a state which meets criteria indicative of the files being ready for the project review meeting. The method further comprises, in response to the computer determining that the files meet the criteria indicative of the document being ready for the project review meeting, the computer determining a plurality of invitees, including an individual modifying at least one of the files, to attend the project review meeting and the computer automatically scheduling the project review meeting with the plurality of invitees.

DETAILED DESCRIPTION

Figure 1:
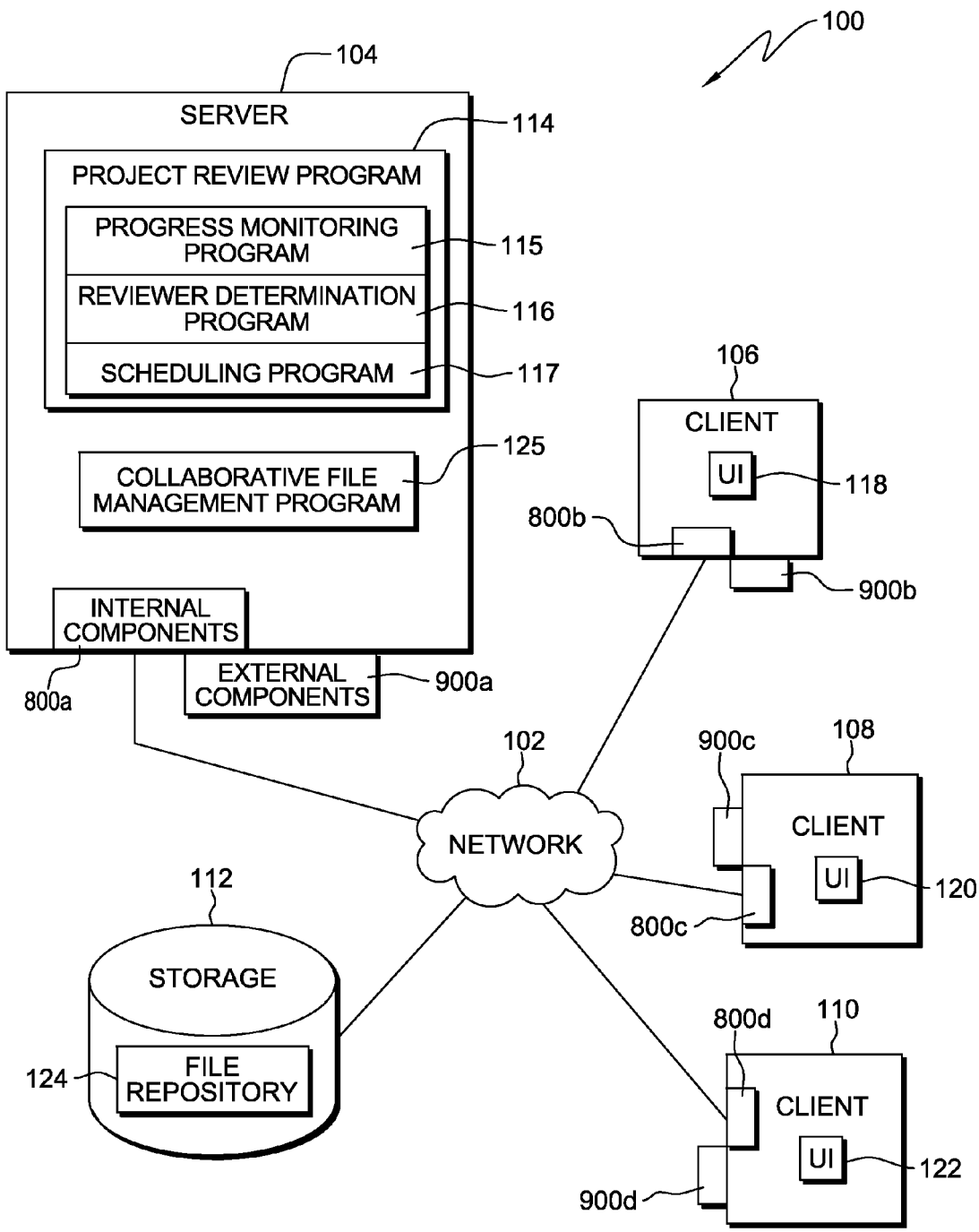
FIG. 1 is a block diagram of a distributed data processing system, including a server computer and multiple client computers, according to an embodiment of the present invention.

The present invention will now be described in detail with reference to the Figures. FIG. 1 illustrates a distributed data processing system, generally designated 100, according to one embodiment of the present invention.

Data processing system 100 comprises a network 102, a server computer 104, multiple client computers such as client computers 106, 108, and 110, and a network storage device 112 containing a file repository 124. In the depicted example, network 102 is the Internet representing a worldwide collection of networks and gateways that use the Transmission Control Protocol/Internet Protocol suite of protocols to communicate with one another. Network 102 may also be implemented as a number of different types of networks, such as an intranet, a local area network (LAN), or a wide area network (WAN). Network 102 includes wire cables, wireless communication links, fiber optic cables, routers, switches and/or firewalls. Server computer 104, client computers 106, 108, and 110, and network storage device 112 are interconnected by network 102.

Server computer 104 may be, for example, a management server, a web server, or any other electronic device or computing system capable of receiving and sending data. In another embodiment, server computer 104 represents a "cloud" of computers interconnected by one or more networks, where server computer 104 is a primary server for a computing system utilizing clustered computers and components to act as a single pool of seamless resources when accessed through network 102. This is a common implementation for data centers in addition to cloud computing applications. Client computers 106, 108, and 110 are clients to server computer 104 and may be, for example, a notebook, a laptop computer, a tablet computer, a handheld device or smart-phone, a thin client, or any other electronic device or computing system capable of communicating with server computer 104 through network 102.

Server computer 104 executes project review program 114 for arranging project review meetings. Project review program 114 includes progress monitoring program function 115 to monitor progress in the product development and determine completion of milestones or predefined criteria at which to schedule project review meetings. Project review program 114 also includes reviewer determination program function 116 to determine which people should participate in the project review meeting. Project review program 114 also includes scheduling program function 117 to actually schedule the project review meetings based on input from program functions 115 and 116. In one embodiment, the product is software being developed collaboratively by a number of different people. Scheduling program 117 receives notification of the completion of the predefined criteria from progress monitoring program 115, which passively and/or actively monitors a project document to determine if the criteria have been met. Reviewer determination program 116 may inform scheduling program 117 of the individuals and collaborators that should be scheduled and/or notified of the project review meeting. In one embodiment, reviewer determination program 116 can access a known Rational™ Team Concert/Jazz tool which maintains a list of developers of a software product, and the software functions which they are assigned to write.

File repository 124 is a central data location where project software and project documents may be managed by collaborative file management program 125 on server 104. File repository 124 is stored in storage device 112 which can be local or remote to server 104. Exemplary management tools provided by file management program 125 include a document editor, work-item tracking, version control (also referred to as source control or revision control), and build management. Such tools are included in previously known collaboration software such as IBM Rational Team Concert™ software. Users of client computers 106, 108, and 110 may access and edit the software and other documents in file repository 124 as allowed by file management program 125. In other embodiments, project software and other documents may be stored, in addition to or alternative to being stored in file repository 124, on separate computer systems such as client computers 106, 108, and 110.

Client computers 106, 108, and 110 contain respective user interfaces (UIs) 118, 120, and 122 for interfacing with project review program 114, file repository 124, and/or file management program 125.

Server computer 104 and client computers 106, 108 and 110, each include respective internal components 800a, 800b, 800c, and 800d, and respective external components 900a, 900b, 900c, and 900d, as described in more detail below.

Figure 2:
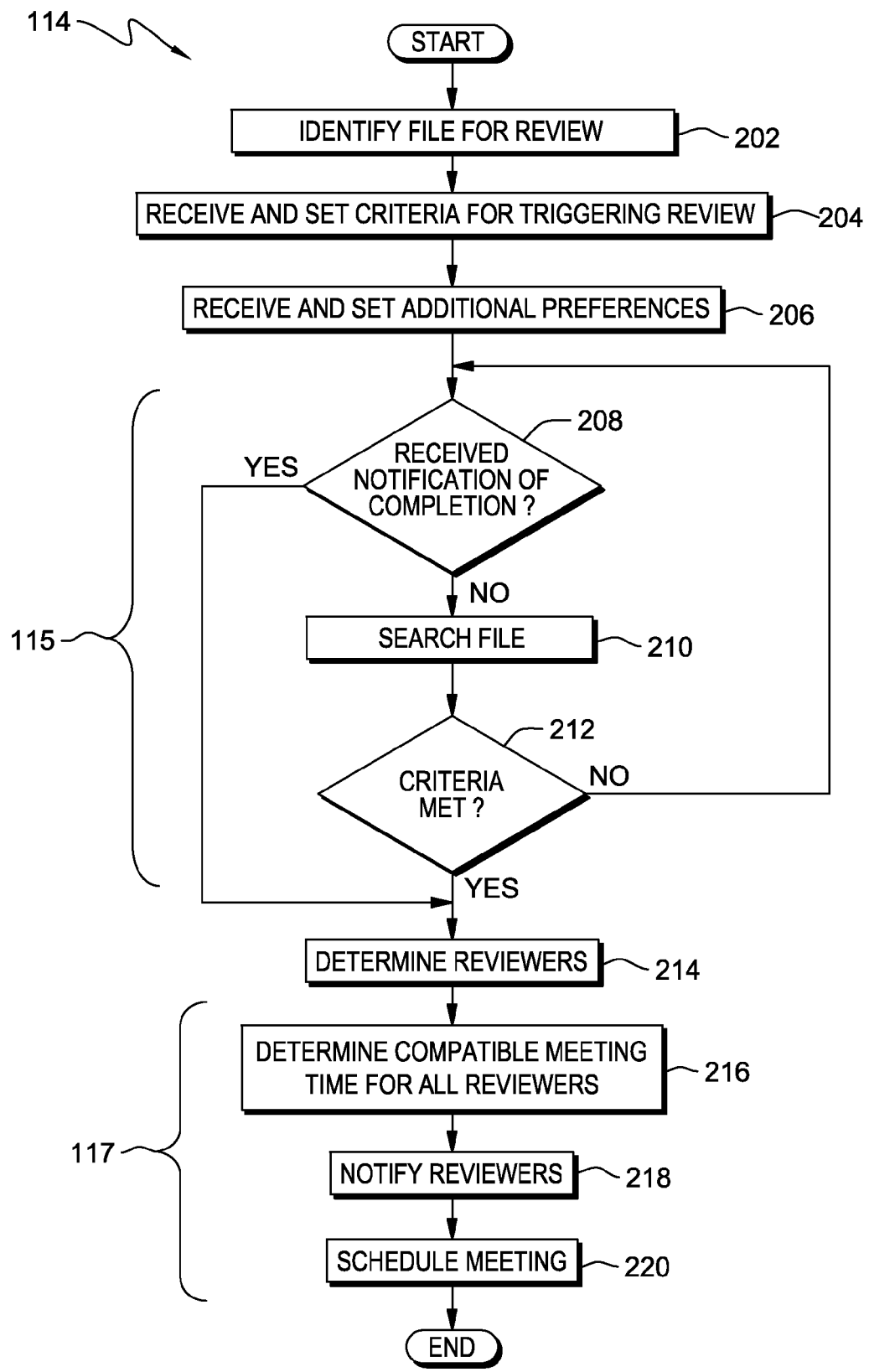
FIG. 2 is a flowchart of the steps of a project review program on the server computer of FIG. 1, for detecting the meeting of predefined criteria and scheduling a review meeting with interested people, in accordance with an embodiment of the present invention.

FIG. 2 is a flowchart of the steps of project review program 114 for arranging project review meetings.

In step 202, project review program 114 identifies one or more files or documents of a project for review. If the project is software development, then a single file of code may be the only file identified. Other files might include separately written applications. For other projects, any number of types of files may be identified, including program files, code files, text files, spreadsheet files, image files, etc.

In one embodiment, project review program 114 identifies the one or more documents by locating all files listed in a directory under the project name. The directory under the project name may include file names and their respective locations, or alternatively, may store entire files (e.g., where the directory is in file repository 124). In one embodiment, project review program 114 may set a future review meeting with an initial entry for time and date "to be determined." Project review program 114 allows a user to browse for or type in a file location for a necessary file or document for the review meeting. The file name and location (or alternatively a copy of the file) is saved in the directory. Similarly, a user may "drag and drop" the desired file into the review meeting directory. The document location is preferably file repository 124. In other embodiments, the document location may be any storage location on server 104, client computers 106, 108, or 110, or network storage 112.

In another embodiment, project review program 114 identifies the one or more documents by receiving a notification that a file has been "marked." In one implementation of this embodiment, a user right clicks on the file in the file explorer and selects an option indicating (marking) that the file needs review. In a second implementation of this embodiment, a user may select an option indicating (marking) that the file needs review within the document default editor (e.g., a prior art Microsoft Word® program, a prior art Visual.net® program, or a prior art IBM Lotus Symphony® program). This embodiment is preferably implemented within partner programs. For example, project review program 114 may be a functionality of a calendar program such as a prior art IBM Lotus Notes® Calendar. IBM Lotus Symphony may be installed with extra functionality to allow a user to "mark" a document as necessary for a project review meeting and send that indication to project review program 114.

Project review program 114 receives and sets criteria for triggering the review meeting (step 204). Here, project review program 114 has the capability of using a number of triggering criteria. In the preferred embodiment, project review program 114 allows a user, such as an administrator or project lead, to define the triggering criteria. An example of one such triggering criterion includes a tag associated with a file or document indicating the file or document's readiness for review. A user may update the tag at the user's discretion. Project review program 114 would receive from a user an indication that such a tag triggers a review meeting. Other criteria for triggering a review that project review program 114 may receive include, in an exemplary list: a specific number of lines in a document or lines of code (in a program code file), a specified number of functions or methods (in a program code file), a specified amount of JavaDoc® being created (if code), a specified number of unit tests created (if code), a specified percentage of the unit tests passing successfully, a specified number of headers and/or sub-headers, and/or a specified word count. Receiving the criteria also includes receiving the relationship between the criteria. For example, whether all criteria must be met, a subset of the criteria, or if one criterion individually is enough to trigger the review.

Based on the received criteria, project review program 114 sets the criteria that must be met for project review program 114 to schedule the project review meeting. If multiple documents are necessary for the meeting, project review program 114 sets the criteria for all the documents.

Project review program 114 receives from a user and sets any additional preferences for scheduling the review (step 206) not related to one of the one or more documents or files necessary for the review meeting. In one embodiment, project review program 114 receives from the user an earliest and latest possible date to schedule the meeting. In another embodiment, project review program 114 receives from the user a desired period of time to wait after the criteria has been met before scheduling the review meeting to allow people attending the review meeting time to review the documents prior to the project review meeting.

After criteria and preferences are set, project review program 114 determines whether a notification of completion has been received (decision block 208). Project review program 114 receives such a notification from either a user or collaborative file management program 125, which may include a document editor and other management tools. Collaborative file management program 125 monitors the development of the software file or document including the number of lines of code which have been written, the number/types of program functions which have been completed (metadata associated with each program function indicates its type, and the program developer indicates when the program function has been completed), a specified amount of JavaDoc® created, a specified number of unit tests created, a specified percentage of the unit tests passing successfully, a specified number of headers and/or sub-headers, and/or a specified word count. Collaborative file management program 125 may scan the file line by line to determine lines of code, word count, etc. Additionally, searchable metadata may be associated with functions, unit tests, headers, JavaDoc, etc., identifying them as such.

In a preferred embodiment, in addition to passively receiving notification of triggering criteria being met, if project review program 114 has not received such notification (negative branch of decision 208), project review program 114 actively searches the file(s) for information indicating that the foregoing project review scheduling criteria has been met (step 210). In one embodiment, project review program 114, at predetermined intervals, queries the file(s) identified for review to determine if the criteria set for the file(s) has been met. In another embodiment, project review program 114 may scan each respective file line by line similar to collaborative file management program 125.

Based on the search of the file(s), project review program 114 determines whether the criteria for triggering the review meeting have been met (decision block 212). In one embodiment, project review program 114 also takes into account an end date, received as a preference in step 206, by which the review meeting must be scheduled.

If the criteria for triggering the review meeting have been met (positive branch of decision 212), or alternatively, if project review program 114 received a notification of completion (positive branch of decision 208), project review program 114 determines the reviewers or collaborators that should be present at the review meeting (step 214). If the criteria for triggering the review meeting have not been met (negative branch of decision 212), project review program 114 continues in a monitoring state where project review program 114 continues to determine if a completion notification has been received (step 208—passive monitoring) and actively searches the file(s) to determine if the triggering criteria have been met (steps 210 and 212—active monitoring). In another embodiment, project review program 114 may do either passive monitoring or active monitoring without the other.

Collectively, steps 208, 210, and 212 may comprise progress monitoring program function 115 within project review program 114.

In an alternate embodiment, if scheduling program 117 determines that the criteria for triggering the review meeting have not been met, and determines that an end date by which the review meeting must be scheduled is approaching, scheduling program 117 sends out reminders, to individuals assigned to the document or file, of the approaching due date.

In step 214, project review program 114 determines the people who should attend the project review meeting, i.e., code developers, documentation writers, managers of the code developers and documentation writers, and/or members of a development team assigned to the project. In one embodiment, project review program 114 receives from the user a set of required and/or optional people to attend the project review meeting for the named project. In another embodiment, project review program 114 automatically determines the people who should attend the project review meeting, as follows. Reviewer determination program function 116 determines the individuals who at any given time modified the document; their names are recorded by collaborative file management program 125 from authentication information they provided to access the software code or document. Reviewer determination program function 116 determines the individuals who at any time were involved in document related collaborations (e.g., emails, instant messages, and internet posts that reference the document) as determined from a search engine that searches these communications for the name of the project or software being developed. Reviewer determination program function 116 determines from a Rational™ Team Concert/Jazz tool the individuals who are developing the software. Reviewer determination program function 116 determines from an employee directory the individuals or personnel that have predefined relations to an above identified individual (e.g., manager and/or co-workers of an individual who modified the document). For example, an IBM™ Blue Pages™ directory lists each employee and his or her manager. Reviewer determination program function 116 may also determine authors of newly developed functions. Such an embodiment is described with more detail below.

After determining that predefined criteria have been met, and determining the people who should attend the meeting (i.e., the reviewers), project review program 114 determines a meeting time for the reviewers (step 216). In a preferred embodiment, project review program 114 has access to each person's personal calendar or schedule. Based on each person's schedule, and preferably received preferences (such as an earliest date, review period, etc.) project review program 114 finds a time when the people that should attend are available. In one embodiment, if project review program 114 finds no time within a given period (e.g., two days) where all the people that should attend are available, project review program 114 finds a time within the period where the most people can be scheduled for the review meeting. Additionally, the schedules of "optional" reviewers may be ignored by project review program 114.

After determining a compatible meeting time, project review program 114 notifies all the people that should attend (step 218) of the time and the location of the review meeting, and schedules the meeting (step 220).

Collectively, steps 216, 218, and 220 may comprise scheduling program function 117 within project review program 114.

Figure 3:
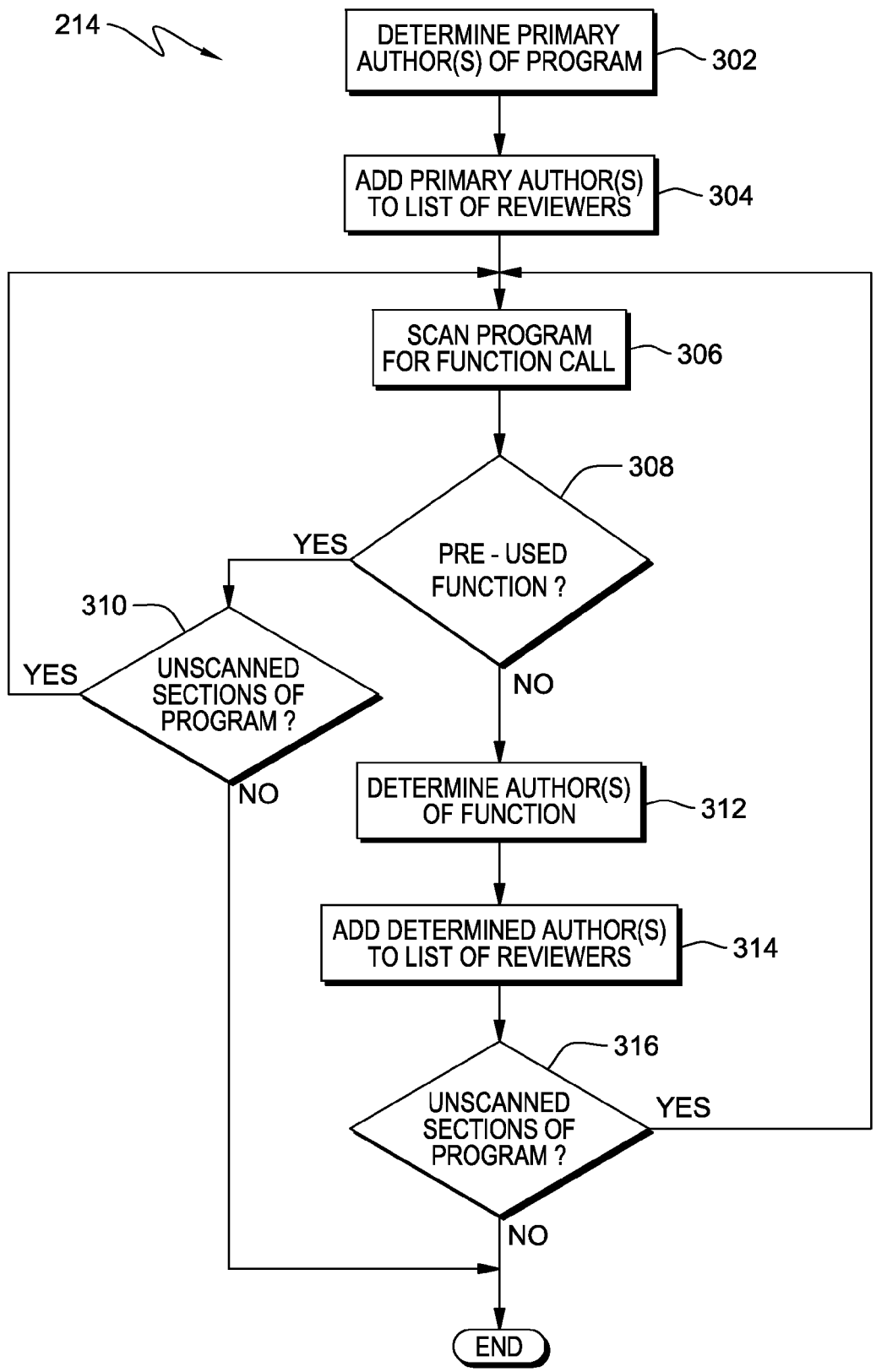
FIG. 3 is a flowchart of the steps of a reviewer determination program, residing on the server computer of FIG. 1, for determining the interested parties to invite, in accordance with an embodiment of the present invention.

FIG. 3 is an exemplary flowchart of the steps of one implementation of step 214 of FIG. 2, i.e., reviewer determination program 116 for determining the meeting participants where the one or more documents are program code.

Reviewer determination program 116 determines the primary author(s) of the program code (step 302). In one embodiment, the primary author(s) are received by project review program 114 from a user when files are identified for a review meeting. For example, a user browses through files to select one or more files for review, and enters one or more names of individuals that each file has been assigned to. Reviewer determination program 116 determines that these are the primary author(s). In another embodiment, reviewer determination program 116 scans header comments in the code files for names of the primary authors. In another embodiment, reviewer determination program 116 queries a Rational™ Team Concert/Jazz tool for the list of authors.

Reviewer determination program 116 adds any determined primary authors to a list of reviewers (step 304).

Reviewer determination program 116 scans the program code for any function calls (or methods or components) (step 306). At each function call, reviewer determination program 116 determines if the called function is a substantially previously-written function available from a library of "stock" functions (although some customization may be needed) (decision block 308). This may be accomplished by searching for an origination date in metadata or comments on or surrounding the function call. Alternatively, a function call may be in a list of known stock functions. In another embodiment, collaborative file management program 125 records automatically inserted lines of code and/or large sections added at once as indicative of pre-written code. Reviewer determination program 116 queries collaborative file management program 125 for which lines and/or sections are pre-written. If the called function is a stock function (positive branch of decision 308), the authors of the function are not to be included in the project review meeting and reviewer determination program 116 determines whether there are unscanned sections of the program code (decision block 310). If there are unscanned sections (decision 310, yes branch), reviewer determination program 116 returns to step 306 to continue scanning the program code for function calls. If all of the program code has been scanned (decision 310, no branch), reviewer determination program 116 ends.

Refer again to decision 308, no branch, if reviewer determination program 116 determines that the called function is not pre-written or pre-used, reviewer determination program 116 determines the author(s) of the called function (step 312) by searching metadata and/or comments in and surrounding the function. Next, reviewer determination program 116 adds the determined author(s) of the called function to the list of people that should participate in the review (step 314). Reviewer determination program 116 determines whether there are unscanned sections of the program (decision block 316), and if there are, returns to step 306 to continue scanning the program for function calls. If all of the program code has been scanned, reviewer determination program 116 ends.

Figure 4:
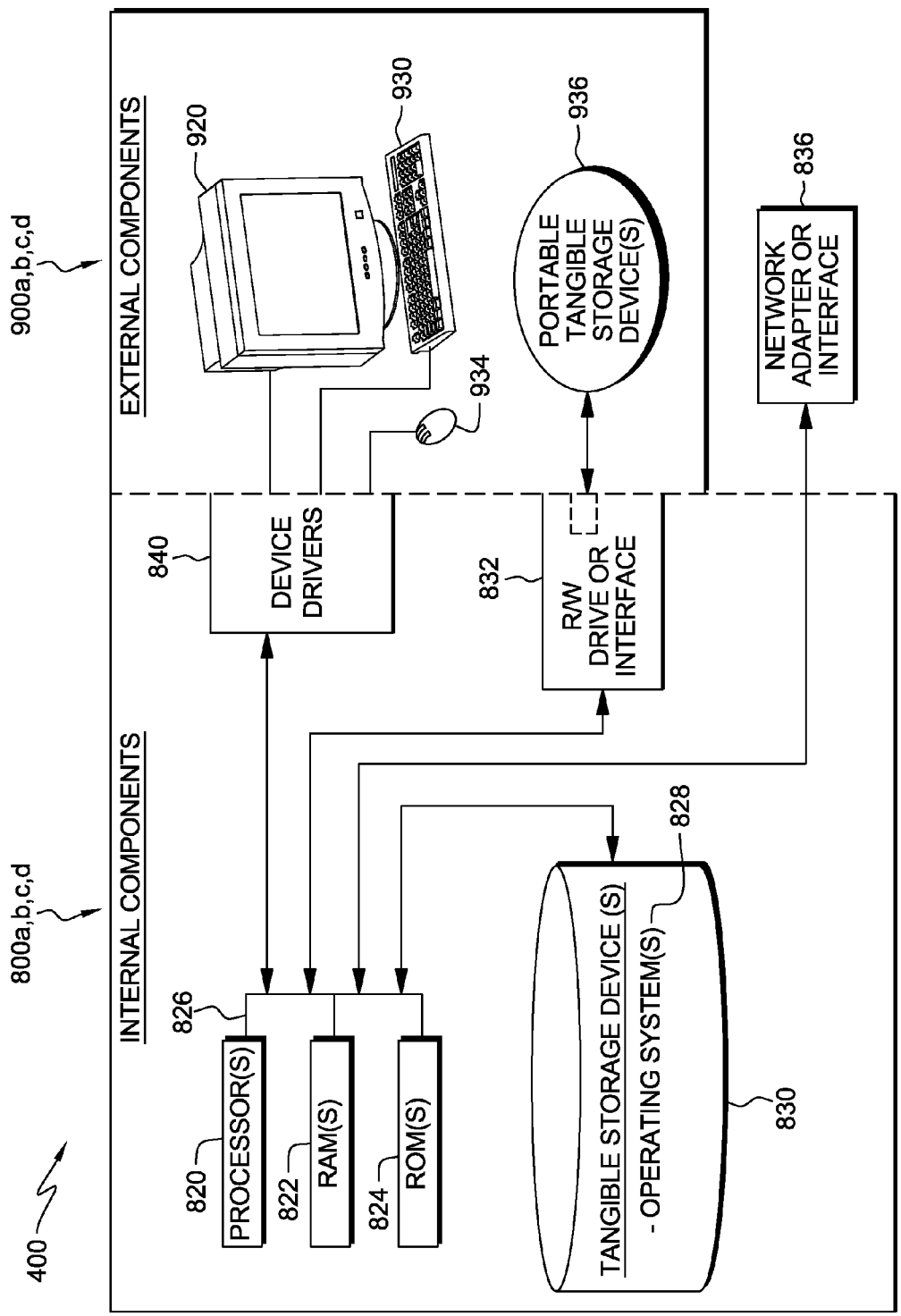
FIG. 4 depicts a block diagram of internal and external components of the server computer and client computers of FIG. 1.

FIG. 4 shows a block diagram of the components of data processing system 400, representative of server computer 104, client computer 106, client computer 108, and client computer 110. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 400 is representative of any electronic device capable of executing machine-readable program instructions. Data processing system 400 may be representative of a smart phone, a computer system, PDA, or other electronic devices. Examples of computing systems, environments, and/or configurations that may be represented by data processing system 400 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

Server computer 104, client computer 106, client computer 108, and client computer 110 include respective sets of internal components 800a, b, c, d and external components 900a, b, c, d illustrated in FIG. 4. Each of the sets of internal components 800a, b, c, d includes one or more processors 820, one or more computer-readable RAMs 822 and one or more computer-readable ROMs 824 on one or more buses 826, and one or more operating systems 828 and one or more computer-readable storage devices 830. The one or more operating systems 828 and programs 114 and 125 on server computer 104; UI 118 in client computer 106; UI 120 in client computer 108; and UI 122 in client computer 110 are stored on one or more of the respective computer-readable storage devices 830 for execution by one or more of the respective processors 820 via one or more of the respective RAMs 822 (which typically include cache memory). In the embodiment illustrated in FIG. 4, each of the computer-readable storage devices 830 is a magnetic disk storage device of an internal hard drive. Alternatively, each of the computer-readable storage devices 830 is a semiconductor storage device such as ROM 824, EPROM, flash memory or any other computer-readable storage device that can store a computer program and digital information.

Each set of internal components 800a, b, c, d also includes a R/W drive or interface 832 to read from and write to one or more portable computer-readable storage devices 936 such as a CD-ROM, DVD, memory stick, magnetic tape, magnetic disk, optical disk or semiconductor storage device. The programs 114 and 125 on server computer 104; UI 118 in client computer 106; UI 120 in client computer 108; and UI 122 in client computer 110 can be stored on one or more of the respective portable computer-readable storage devices 936, read via the respective R/W drive or interface 832 and loaded into the respective hard drive 830. The term "computer-readable storage device" does not encompass signal propagation media such as copper cables, optical fibers and wireless transmission media.

Each set of internal components 800a, b, c, d also includes network adapters or interfaces 836, such as a TCP/IP adapter cards, wireless Wi-Fi interface cards, or 3G or 4G wireless interface cards or other wired or wireless communication links. The programs 114 and 125 on server computer 104; UI 118 in client computer 106; UI 120 in client computer 108; and UI 122 in client computer 110 can be downloaded to respective computers 104, 106, 108, and 110 from an external computer via a network (for example, the Internet, a local area network or other, wide area network) and respective network adapters or interfaces 836. From the network adapters or interfaces 836, the programs 114 and 125 on server computer 104; UI 118 in client computer 106; UI 120 in client computer 108; and UI 122 in client computer 110 are loaded into the respective hard drive 830. The network may comprise copper wires, optical fibers, wireless transmission, routers, firewalls, switches, gateway computers and/or edge servers.

Each of the sets of external components 900a, b, c, d can include a computer display monitor 920, a keyboard 930, and a computer mouse 934. External components 900 a, b, c, d can also include touch screens, virtual keyboards, touch pads, pointing devices, and other human interface devices. Each of the sets of internal components 800a, b, c, d also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

The aforementioned programs can be written in various programming languages (such as Java or C++) including low-level, high-level, object-oriented or non object-oriented languages. Alternatively, the functions of the aforementioned programs can be implemented in whole or in part by computer circuits and other hardware (not shown).

Based on the foregoing, a method, computer system, and computer program product have been disclosed for automatically scheduling project review meetings. However, numerous modifications and substitutions can be made without deviating from the scope of the present invention. Therefore, the present invention has been disclosed by way of example and not limitation.

What is claimed is:

1. A method for scheduling a project review meeting for development of program code, the method comprising the steps of:

a computer determining whether development of the program code has progressed to a state which meets pre-determined criteria indicative of the program code being ready for the project review meeting; and in response to the computer determining that the program code meets the pre-determined criteria indicative of the program code being ready for the project review meeting, the computer identifying from the program code a call to a program function and determining whether the called program function was previously written, and if the called program function was not previously written, the computer identifying a developer of the called program function and the computer automatically scheduling the project review meeting and inviting the developer of the called program function and a developer of the program code who is different than the developer of the called program function, and if the called program function was previously written, the computer automatically scheduling the project review meeting and inviting the developer of the program code but not inviting the developer of the called program function.

2. The method of claim 1, further comprising the step of the computer, prior to determining whether the development of the program code has progressed to the state which meets the pre-determined criteria indicative of the program code being ready for the project review meeting, receiving from a user, the pre-determined criteria indicative of the program code being ready for the project review meeting.

3. The method of claim 1, wherein the pre-determined criteria is selected from a group comprising: a specific tag associated with the program code, a specified number of functions, a specified number of unit tests created, a percentage of unit tests being passed successfully, a specified number of headers and subheaders, and word count.

4. The method of claim 1, wherein the step of the computer identifying the developer of the called program function comprises at least one of the following steps:

the computer scanning comments associated with the called program function for a name of the developer;

the computer scanning metadata associated with the called program function for the name of the developer; and the computer querying a directory for the name of the developer assigned to write the called program function.

5. The method of claim 1, wherein the step of the computer automatically scheduling the project review meeting comprises the steps of:

the computer determining a time for the project review meeting based on a digitally stored schedule for the developer of the called program function; and the computer taking into account any predefined scheduling preferences.

6. The method of claim 1, further comprising the step of the computer digitally notifying the developer of the called program function of the scheduled time for the project review meeting.

7. The method of claim 1, wherein the computer identifies the developer of the program code from comments in the program code and identifies the developer of the called program function from comments in other program code of the called program function.

8. A method for scheduling a project review meeting for development of program code, the method comprising the steps of:

a computer determining, based in part on a number of unit tests passed for the program code, that development of the program code has progressed to a state which meets pre-determined criteria indicative of the program code being ready for the project review meeting, and in response, the computer identifying a developer of the program code from comments in the program code, and the computer automatically scheduling the project review meeting and inviting the developer of the program code to the project review meeting.

9. A computer program product for scheduling a project review meeting for development of program code, the computer program product comprising:

one or more computer-readable storage devices and program instructions stored on at least one of the one or more storage devices, the program instructions comprising:

program instructions to determine whether development of the program code has progressed to a state which meets pre-determined criteria indicative of the program code being ready for the project review meeting; and program instructions to, in response to determining that the program code meets the pre-defined criteria indicative of the program code being ready for the project review meeting, identify from the program code a call to a program function and determine whether the called program function was previously written, and if the called program function was not previously written, program instructions to identify a developer of the called program function and automatically schedule the project review meeting and invite the developer of the called program function and a developer of the program code who is different than the developer of the called program function, and if the called program function was previously written, program instructions to automatically schedule the project review meeting and invite the developer of the program code but not invite the developer of the called program function.

10. The computer program product of claim 9, further comprising program instructions, stored on at least one of the one or more storage devices, to, prior to determining whether the development of the program code has progressed to the state which meets the pre-determined criteria indicative of the program code being ready for the project review meeting, receive from a user, the pre-determined criteria indicative of the program code being ready for the project review meeting.

11. The computer program product of claim 9, wherein the pre-determined criteria is selected from a group comprising: a specific tag associated with the program code, a specified number of functions, a specified number of unit tests created, a percentage of unit tests being passed successfully, a specified number of headers and subheaders, and word count.

12. The computer program product of claim 9, wherein the program instructions to determine whether the development of the program code has progressed to the state which meets the pre-determined criteria indicative of the program code being ready for the project review meeting, comprises program instructions to:

scan one or more of the program code, metadata associated with the program code, and comments within the program code to determine a property of the program code comprising one or more tags associated with the program code, a number of functions written within the program code, a number of unit tests created, a number of unit tests passed, a number of headers and subheaders, or a number of words; and compare the property of the program code to the pre-determined criteria to determine if the program code meets the pre-determined criteria.

13. The computer program product of claim 9, wherein the program instructions to identify the developer of the called program function comprises one or more of:
   program instructions to scan comments associated with the called program function for a name of the developer;
   program instructions to scan metadata associated with the called program function for the name of the developer; and
   program instructions to query a directory for the name of the developer assigned to write the called program function.

14. The computer program product of claim 9, wherein the program instructions to automatically schedule the project review meeting comprise program instructions to:
   determine a time for the project review meeting based on a digitally stored schedule for the developer of the called program function and any predefined scheduling preferences.

15. The computer program product of claim 9, further comprising program instructions, stored on at least one of the one or more storage devices, to digitally notify the developer of the called program function of the scheduled time for the project review meeting.

16. The computer program product of claim 9, wherein the program instruction to identify the developer of the program code comprise program instructions to identify the developer of the program code from comments in the program code and the program instructions to identify the developer of the called program function comprise program instructions to identify the developer of the called program function from comments in other program code of the called program function.

* * * * *